United States Patent [19]
Nakamura et al.

[11] Patent Number: 5,990,645
[45] Date of Patent: Nov. 23, 1999

[54] MECHANICAL VIBRATION DETECTOR AND VIBRATION DAMPING CONTROLLER

[75] Inventors: Hiroshi Nakamura; Shoji Takamatsu; Yasuhiko Kaku, all of Fukuoka, Japan

[73] Assignee: Kabushiki Kaisha Yaskawa Denki, Kitakyushu, Japan

[21] Appl. No.: 09/011,844

[22] PCT Filed: Aug. 13, 1996

[86] PCT No.: PCT/JP96/02289

§ 371 Date: Feb. 18, 1998

§ 102(e) Date: Feb. 18, 1998

[87] PCT Pub. No.: WO97/07590

PCT Pub. Date: Feb. 27, 1997

[30] Foreign Application Priority Data

Aug. 18, 1995 [JP] Japan ................................. 7-233528

[51] Int. Cl.[6] ............................................... H02P 7/00
[52] U.S. Cl. ..................... 318/432; 318/114; 318/128; 318/460; 310/51
[58] Field of Search ........................... 73/660, 662, 668; 318/432, 434, 114, 128, 460; 310/51

[56] References Cited

U.S. PATENT DOCUMENTS

| | | | |
|---|---|---|---|
| 4,419,897 | 12/1983 | Matsuoka | 73/660 |
| 5,831,401 | 11/1998 | Coleman | 318/114 |
| 5,850,130 | 12/1998 | Fujisaki et al. | 318/439 |

FOREIGN PATENT DOCUMENTS

| | | |
|---|---|---|
| 0407590 | 1/1991 | European Pat. Off. . |
| 0523255 | 1/1993 | European Pat. Off. . |
| 7-337057 | 12/1995 | Japan . |
| WO 93/12477 | 6/1993 | WIPO . |

OTHER PUBLICATIONS

Seung–Ho Song et al., "Torsional Vibration Suppression Control in 2–Mass System by State Feedback Speed Controller", Proceedings of the IEEE Conference on Control Applications, Vancouver, B.C., Sep. 13, 1993, pp. 129–134.

*Primary Examiner*—David Martin
*Attorney, Agent, or Firm*—Morgan, Lewis & Bockius LLP

[57] ABSTRACT

Provided is a mechanical-vibration detecting apparatus in which not only adjustment is easy but also mechanical vibration can be taken out with high accuracy, and a vibration-reduction control apparatus by which reduction of mechanical vibration can be achieved. In a motor control apparatus for controlling the torque of a motor, provided are an equivalent rigid body model 103; a proportional operation means 104; a high-pass filter 105; and means for adding a torque signal and an output of the proportional operation means to supply a resulting addition signal to the equivalent rigid body model, and for subtracting an output of the equivalent rigid body model from a velocity signal of the motor control apparatus to supply a resulting difference signal to the proportional operation means and to the high-pass filter so that an output of the high-pass filter is used as a mechanical vibration control signal.

7 Claims, 4 Drawing Sheets

MECHANICAL VIBRATION DETECTOR AND VIBRATION DAMPING CONTROLLER

TECHNICAL FIELD

The present invention relates to a motor control apparatus having a mechanical-vibration detecting apparatus for detecting the vibration of a mechanism driven by a motor.

BACKGROUND ART

As a mechanical-vibration detecting apparatus and a vibration-reduction control apparatus in a motor control system, there is an apparatus proposed in Japanese Patent Application No. 127859/94 filed by this applicant. In this prior art, a motor-containing mechanism system is separated into an equivalent rigid body system and a mechanical vibration system so that mechanical vibration is estimated at a high speed by an observer based on an equivalent rigid body system model to perform vibration reduction control.

In the prior art, however, a quadratic observer is constituted with the angular velocity and step-like torque disturbance of the equivalent rigid body system as state variables, so that not only an equivalent rigid body model and a proportional operation means but also an integrating operation means are required in order to constitute a mechanical-vibration detecting apparatus. Two parameters are required to be set for the observer and, furthermore, the phase of a mechanical vibration signal varies largely in accordance with the set-values of the parameters so that there arises a problem that it is difficult to adjust the parameters.

DISCLOSURE OF THE INVENTION

Therefore, an object of the present invention is to provide a mechanical-vibration detecting apparatus in which not only adjustment is easy but also mechanical vibration can be taken out with high accuracy, and to provide a vibration-reduction control apparatus by which reduction of mechanical vibration can be achieved.

In order to achieve the above problem, in a motor control apparatus for controlling the torque of a motor, the first invention of the present application is characterized by comprising:

an equivalent rigid body model;

a proportional operation means;

a high-pass filter; and means for adding a torque signal of the motor control apparatus and an output of the proportional operation means to supply a resulting addition signal to the equivalent rigid body model, and for subtracting an output of the equivalent rigid body model from a velocity signal of the motor control apparatus to supply a resulting difference signal to the proportional operation means and to the high-pass filter so that an output of the high-pass filter is used as a mechanical vibration control signal.

In a motor control-apparatus for controlling the torque of a motor, the second invention of the present application is characterized by comprising:

an equivalent rigid body model;

a proportional operation means;

a high-pass filter;

a phase adjuster;

an amplitude adjuster; and means for adding a torque signal of the motor control apparatus and an output of the proportional operation means to supply a resulting addition signal to the equivalent rigid body model, and for subtracting an output of the equivalent rigid body model from a velocity signal of the motor control apparatus to supply a resulting difference signal to the proportional operation means and to the high-pass filter, wherein an output of the high-pass filter is supplied to the phase adjuster and an output of the phase adjuster is supplied to the amplitude adjuster so that a signal obtained by adding an output of the amplitude adjuster to a torque command given to the motor control apparatus is used as a new torque command.

In a motor control apparatus for controlling the torque of a motor, the third invention of the present application is characterized by comprising:

an equivalent rigid body model;

a proportional operation means;

a high-pass filter;

a phase adjuster;

an amplitude adjuster; and means for adding a torque signal of the motor control apparatus and an output of the proportional operation means to supply a resulting addition signal to the equivalent rigid body model and for subtracting an output of the equivalent rigid body model from a velocity signal of the motor control apparatus to supply a resulting difference signal to the proportional operation means and to the high-pass filter, wherein an output of the high-pass filter is supplied to the phase adjuster and an output of the phase adjuster is supplied to the amplitude adjuster so that a signal obtained by adding an output of the amplitude adjuster to a velocity command given to the motor control apparatus is used as a new velocity command By the aforementioned means, a linear equivalent rigid body observer is constituted so that one integrating means becomes unnecessary and the range of the parameter for stabilizing the system is widened correspondingly. Furthermore, because only one parameter is required for setting the observer and the sensitivity of the parameter is low with respect to the phase of the mechanical vibration signal, it is easy to adjust the parameter.

As described above, according to the present invention, it is possible to constitute an equivalent rigid body observer in which the number of parameters to be set is small and the range of the parameter to be set is wide. Accordingly, there arises an effect that it is possible to provide a mechanical-vibration detecting apparatus in which not only adjustment is easy but also mechanical vibration can be taken out with high accuracy, and to provide a vibration-reduction control apparatus by which reduction of mechanical vibration can be achieved.

BEST MODE FOR CARRYING OUT THE INVENTION

Figure 1:
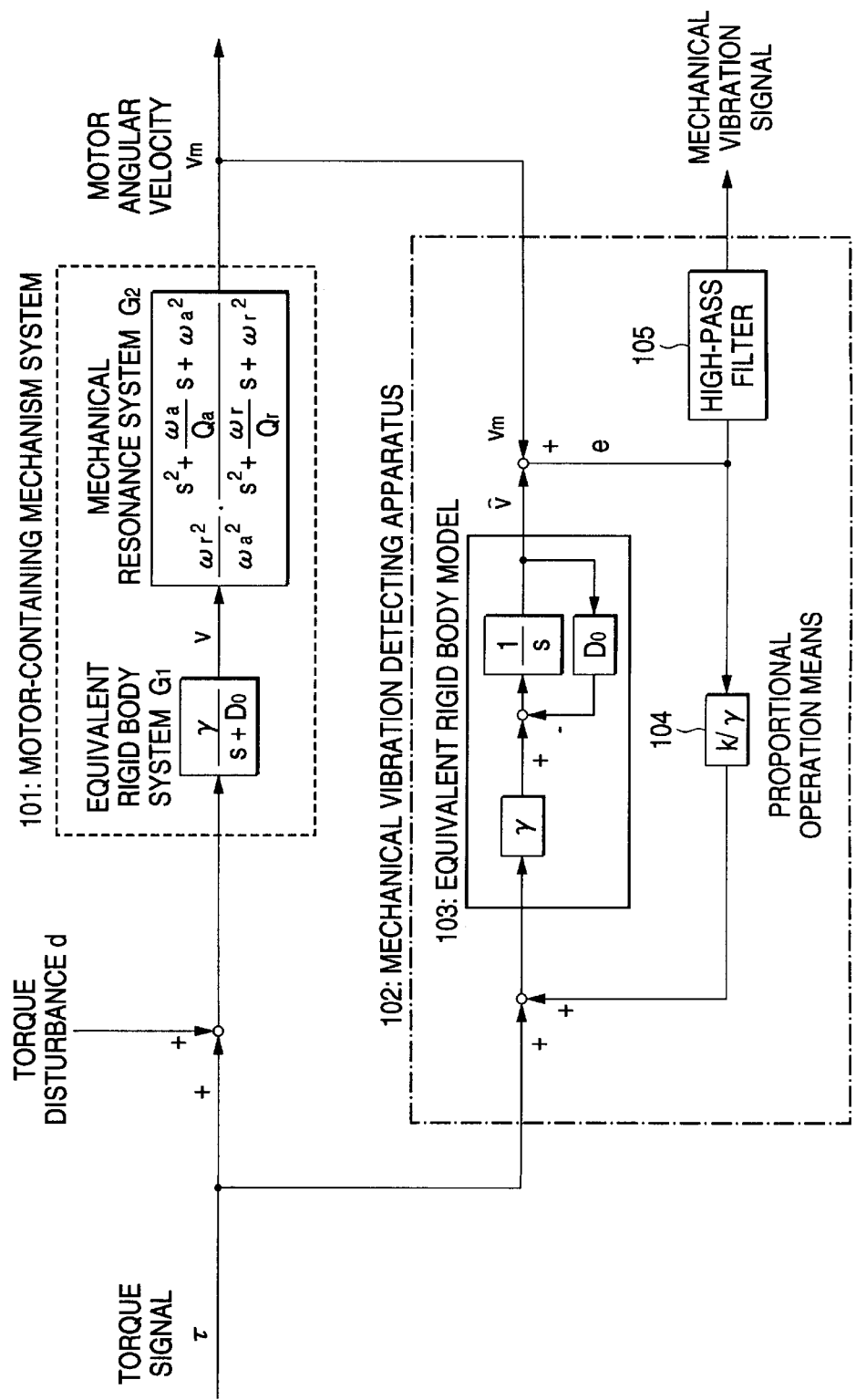
FIG. 1 is a diagram showing a first embodiment of the present invention.

Specific embodiments of the present invention will be described below.

A first embodiment of the present invention as to a mechanical-vibration detecting apparatus illustrated in FIG. 1 will be described. In the drawing, a block 102 shows a mechanical-vibration detecting apparatus constituted by an equivalent rigid body model 103, a proportional operation means 104, and a high-pass filter 105. The apparatus is supplied with a motor torque signal τ and a motor velocity signal (a motor angular velocity $v_m$ is used here) and outputs a mechanical vibration signal. A block 101 shows a mechanism (including a motor) having a mechanical resonance system.

The theory of detection of a mechanical vibration signal will be described below. Using an approximate method proposed in Japanese Patent Application No. 127859/94, a transmission function of the mechanism system 101 can be separated into an equivalent rigid body system $G_1(s)$ and a mechanical resonance system $G_2(s)$ as follows:

$$G_1(s) = \frac{\gamma}{s + D_0} \tag{1}$$

$$G_2(s) = \frac{\omega_r^2}{\omega_a^2} s^2 + \frac{\omega_a}{Q_a} s + \frac{\omega_a^2}{s^2 + \frac{\omega_r}{Q_T}s + \omega_r^2} \tag{2}$$

in which γ is the reciprocal of a moment of inertia of the equivalent rigid body system, $D_0/\gamma$ is the viscous friction coefficient of the equivalent rigid body system, and $\omega_r$ and $\omega_a$ are the resonance frequency and antiresonance frequency of the mechanical resonance system.

First, the theory of the present invention will be described. In FIG. 1, the block 101 surrounded by a broken line shows an mechanism (including electric motor) with a mechanical resonance phenomenon, and the block 102 surrounded by a one-dotted chain line shows a mechanical-vibration detecting apparatus according to the present invention. As an example of the mechanism, assume a 2-inertia torsional resonance system shown in FIG. 2. Equations of motion in the mechanical system in the drawing are given as follows:

$$J_m\ddot{\theta}_m + K(\theta_m - \theta_L) + (D_m + D_T)\dot{\theta}_m - D_T\dot{\theta}_L = u_1 \tag{3a}$$

$$J_L\ddot{\theta}_L + K(\theta_L - \theta_m) + (D_L + D_T)\dot{\theta}_L - D_T\dot{\theta}_m = 0 \tag{3b}$$

in which $\theta_m$: angle of the motor axis [rad]
$\theta_L$: angle of the load axis [rad]
δθ: torsional angle of the equivalent linear spring [rad]
$J_m$: moment of inertia on the motor axis side [Kgm²]
$J_L$: moment of inertia on the load axis side [Kgm²]
K: spring constant of the equivalent linear spring [Nm/rad]
$D_m$: viscous friction coefficient of the motor axis [Nm/(rad/s)]
$D_L$: viscous friction coefficient of the load axis [Nm/(rad/s)]
$D_T$: equivalent viscous friction coefficient of the equivalent linear spring system [Nm/(rad/s)]
$u_1$: torque generated on the motor axis [Nm]

Assuming now that a state variable and an observation output (angular velocity of the motor) are given by the following equations (4a) and (4b) respectively, $$x(t) = \begin{bmatrix} x_1(t) \\ x_2(t) \\ x_3(t) \\ x_4(t) \end{bmatrix} = \begin{bmatrix} \theta_m(t) \\ \theta_L(t) \\ \dot{\theta}_m(t) \\ \dot{\theta}_L(t) \end{bmatrix} \tag{4a}$$

and $$y(t) = \dot{\theta}_m(t) = x_3(t) = [0\ 0\ 1\ 0]x(t) \tag{4b}$$

then state equations (5a) and (5b) are given according to the equations (1a) and (1b) as follows:

$$\dot{x}(t) = Ax(t) + bu(t) \tag{5}$$

$$y(t) = cx(t) \tag{5b}$$

in which $$A = \begin{bmatrix} 0 & 0 & 1 & 0 \\ 0 & 0 & 0 & 1 \\ -\frac{K}{J_m} & \frac{K}{J_m} & -\frac{D_m + D_T}{J_m} & \frac{D_T}{J_m} \\ \frac{K}{J_L} & -\frac{K}{J_L} & \frac{D_T}{J_L} & -\frac{D_L + D_T}{J_L} \end{bmatrix} \tag{6}$$

$$b = \begin{bmatrix} 0 \\ 0 \\ \frac{1}{J_m} \\ 0 \end{bmatrix}$$

$$c = [0\ 0\ 1\ 0]$$

The transfer function from the torque generated in the electric motor to the angular velocity (observation output) of the electric motor is given as follows:

$$G(s) = c(sI-A)^{-1}b$$

$$G(s) = c(sI - A)^{-1}b = G_s(s) = \frac{1}{J_m}s^2 + \frac{D_L + D_T}{J_L}s + \frac{K}{J_L} \over P(s) \tag{7}$$

in which the characteristic equation P(s) is given as follows:

$$P(s) = s^3 + \left(\frac{D_m}{J_m} + \frac{D_T}{J_m} + \frac{D_L}{J_L} + \frac{D_T}{J_L}\right)s^2 + \tag{8}$$

$$\left(\frac{K}{J_m} + \frac{K}{J_L} + \frac{D_m D_T}{J_m J_L} + \frac{D_L D_T}{J_m J_L} + \frac{D_m D_L}{J_m J_L}\right)s + \frac{K(D_m + D_L)}{J_m J_L}$$

It was very difficult to factorize the equation (8) into a product of a first-order expression and a second-order expression because parameters for the electric motor were combined with parameters for the mechanical resonance system. Accordingly, the physical meaning of the equation was not clear, so that a state observer could not but be formed with respect to the whole of the control system.

Therefore, in the present invention, factors in the equation (8) are replaced as follows:

$$D_0 = \frac{D_m + D_L}{(1+\alpha)J_m} \frac{1}{1 + \frac{D_m D_T + D_L D_T + D_m D_L}{(1+\alpha)J_m K}} \quad (9a)$$

$$\frac{\omega_r}{Q_r} = \frac{1}{J_m}\left(D_m + \frac{1}{\alpha}D_L + \frac{1+\alpha}{\alpha}D_T\right) - D_0 \quad (9b)$$

$$\omega_r^2 = \frac{(1+\alpha)K}{\alpha J_m}\left[1 + \frac{D_m D_T + D_L D_T + D_m D_L}{(1+\alpha)J_m K}\right] \quad (9c)$$

in which $\alpha$ is the ratio of moment of inertia of the load to that of the motor as follows:

$$\alpha = J_L/J_m \quad (10)$$

Using the equations (9a) to (9c), the equation (8) is expressed as follows:

$$P(s) = s^3 + (\omega_r/Q_r + D_o)s^2 + \omega_r^2 s + \omega_r^2 D_o \quad (11)$$

Assume newly the following equation:

$$\tilde{P}(s) = (s+D_o)(s^2 + \omega_r/Q_r s + \omega_r^2) \quad (12a)$$

$$= s^3 + (\omega_r/Q_r + D_o)s^2 + (1+\epsilon)\omega_r^2 s + \omega_r^2 D_o \quad (12b)$$

in which $$\epsilon = (1/Q_r)(D_o/\omega_r) \quad (13)$$

From the equations (11) and (12b), the equality $P(s) = \tilde{P}(s)$ holds when $\epsilon = 0$. Accordingly, $\tilde{P}(s)$ is an equation of approximating $P(s)$, and $\epsilon$ expresses an approximation error. It is apparent from the equation (13) that the approximation error $\epsilon$ decreases as $Q_r$ increases. For example, $\epsilon < 0.01$ holds in the case of $Q_r > 10$ and $\omega_r > 10 D_o$.

Assuming the equations (9a) to (9c), then the characteristic equation $P(s)$ can be approximated by $\tilde{P}(s)$ in the equation (12b) as follows:

$$P(s) = s^3 + \left(\frac{D_m}{J_m} + \frac{D_T}{J_m} + \frac{D_L}{J_L} + \frac{D_T}{J_L}\right)s^2 + \left(\frac{K}{J_m} + \frac{K}{J_L} + \frac{D_m D_T}{J_m J_L} + \frac{D_m D_T}{J_m J_L} + \frac{D_m D_T}{J_m J_L}\right)s + \frac{K(D_m + D_L)}{J_m J_L} = (s+D_0)\left(s^2 + \frac{\omega_r}{Q_r}s + \omega_r^2\right) \quad (14)$$

The equation (7) is rearranged by the following equations:

$$\omega_a^2 = \frac{K}{J_L} = \frac{K}{\alpha J_m} \quad (15a)$$

$$\frac{\omega_a}{Q_a} = \frac{D_L + D_T}{J_L} = \frac{D_L + D_T}{\alpha J_m} \quad (15b)$$

Using the equations (14), (15a) and (15b) in the equation (7), the approximate equation of the transfer function can be deduced as follows:

$$\tilde{G}(s) = \frac{1}{J_m}\frac{1}{s+D_0}s^2 + \frac{\omega_a}{Q_a}s + \frac{\omega_a^2}{s^2 + \frac{\omega_r}{Q_r}s + \omega_r^2} \quad (16a)$$

$$= \frac{1}{J_m}\frac{\omega_a^2}{\omega_r^2}\frac{1}{s+D_0}\frac{\omega_r^2}{s^2 + \frac{\omega_r}{Q_r}s + \omega_r^2}s^2 + \frac{\omega_a}{Q_a}s + \frac{\omega_a^2}{\omega_a^2} \quad (16b)$$

When the equations (16a) and (16b) are used, the 2-inertia resonance system can be separated into the equivalent rigid body system $G_1(s)$ shown in the block 101 surrounded by the broken line in FIG. 1 and the mechanical resonance system $G_2(s)$ as follows:

$$G_1(s) = \frac{1}{J_m}\frac{\omega_a^2}{\omega_r^2}\frac{1}{s+D_0} \quad (17a)$$

$$G_2(s) = \frac{\omega_r^2}{s^2 + \frac{\omega_r}{Q_r}s + \omega_r^2}s^2 + \frac{\omega_a}{Q_a}s + \frac{\omega_a^2}{\omega_a^2} \quad (17b)$$

If the velocity of the equivalent rigid body system can be detected, the mechanical vibration component can be detected selectively on the basis of a difference signal which expresses a value obtained by subtracting the detected velocity of the equivalent rigid body system from the observation output.

Therefore, a state observer is constituted with the equivalent rigid body system as a model. If the torque $\tau$ of the motor is used as a control input u under the condition that only the angular velocity v is considered with respect to a state x, according to the differential equation $$\dot{v}(t) = -D_o v(t) + \gamma\tau(t) \quad (18)$$

the state equation of the equivalent rigid body system and the output equation are given as follows:

$$\dot{x}(t) = ax(t) + bu(t) \quad (19a)$$

$$y(t) = cx \quad (19b)$$

in which $x(t) = v(t)$, $u(t) = \tau(t)$, $a = -D_o$, $b = \gamma$, $c = 1$. (19c)

From the aforementioned equations, the observer can be formed as represented by the following equation:

$$\dot{\hat{x}}(t) = (a-kc)\hat{x}(t) + ky(t) + bu(t) \quad (20)$$

From the equations (19) and (20), the estimated angular velocity value
$\hat{v}$
is given by the following equation:

$$\dot{\hat{v}}(t) = -D_o \hat{v}(t) + k(v(t) - \hat{v}(t)) + \gamma\tau(t) \quad (21)$$

Figure 2:
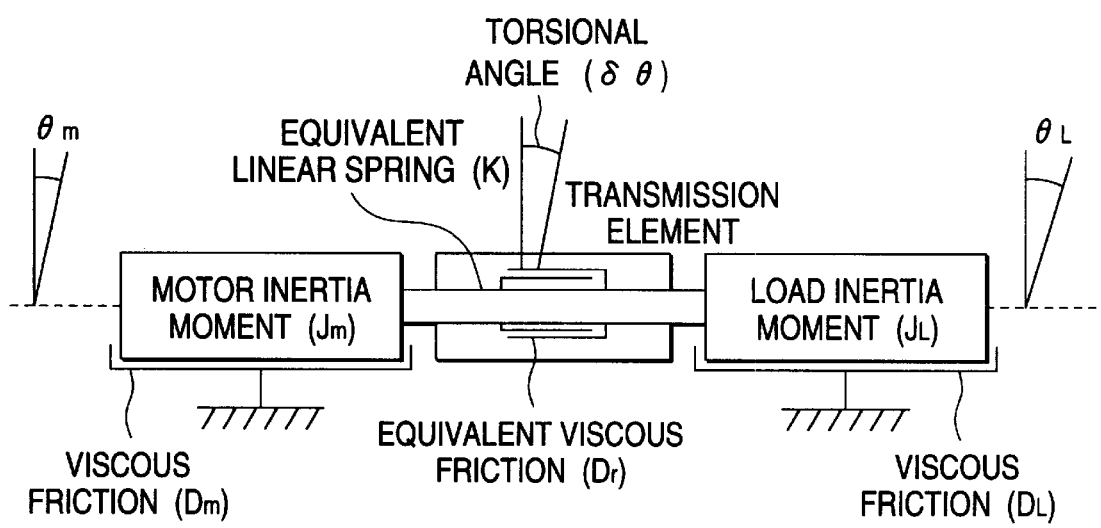
FIG. 2 is a diagram for explaining an example of a resonance mechanism.

Assuming that the output y is given as the motor angular velocity $v_m$ instead of v, then the equation (21) can be expressed by the block diagram in the block 102 of FIG. 1.

The mechanical vibration signal to be measured is obtained on the basis of the following signal e of difference between the angular velocity of the motor and the estimated angular velocity value of the equivalent rigid body system:

$$e(t) = v_m(t) - \hat{v}(t) \quad (22)$$

However, because the observer represented by the equation (20) does not consider torque disturbance d, an estimation error remains in the difference signal e if there is step-like torque disturbance d. Therefore, the difference signal e is passed through the high-pass filter 105 so that a signal obtained by removal of the estimated error due to the torque disturbance is used as a mechanical vibration signal. From the above description, a mechanical vibration signal is obtained by the configuration in the mechanism vibration detecting apparatus 102.

Figure 3:
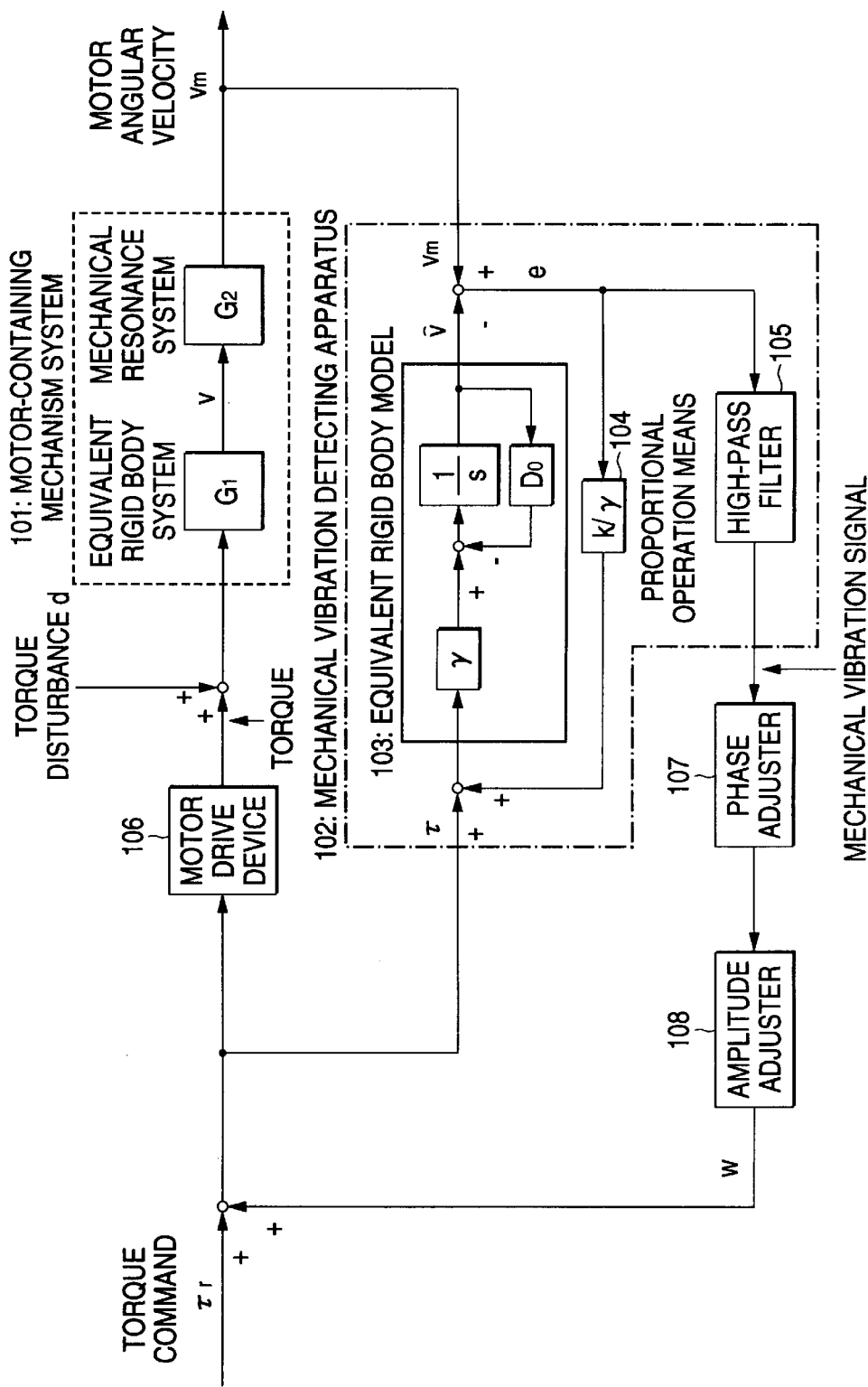
FIG. 3 is a diagram showing a second embodiment of the present invention.

A second embodiment of the present invention as to the vibration-reduction control apparatus will be described below with reference to FIG. 3. FIG. 3 shows the case where the present invention is applied to a motor torque control apparatus. In FIG. 3, the motor-containing mechanism system 101 and the mechanical-vibration detecting apparatus 102 are the same as those in the first embodiment. The reference numeral 106 designates a motor drive device which is supplied with a torque command and which outputs torque generated by the motor. The motor drive device 106 is constituted by a power amplifier, and so on. As a motor torque signal τ to be supplied to the mechanical-vibration detecting apparatus 102, a generated torque monitor signal or a torque command signal is used. The mechanical vibration signal estimated by the mechanical-vibration detecting apparatus 102 is supplied to the phase adjuster 107. The output of the phase adjuster 107 is supplied to the amplitude adjuster 108, so that a signal obtained by addition of the output w of the amplitude adjuster 108 to the torque command is supplied, as a new torque command, to the motor torque control apparatus.

The phase adjuster 107 and the amplitude adjuster 108 adjust the phase and amplitude of the mechanical vibration signal which is an output of the mechanical-vibration detecting apparatus 102 so as to suppress the vibration of the control system containing the motor and the mechanical resonance system. Because the mechanical vibration signal output from the mechanical-vibration detecting apparatus 102 is advanced in phase than the vibration of motor angular velocity $v_m$ and the degree of the phase advance is adjusted on the basis of the gain k of the proportional operation means 104, the phase adjuster 107 may be constituted by a phase delay element such as a low-pass filter, or the like. The amplitude adjuster 108 may be constituted by an amplifier or an arithmetic unit for multiplying the output signal of the phase adjuster 107 by the gain.

Figure 4:
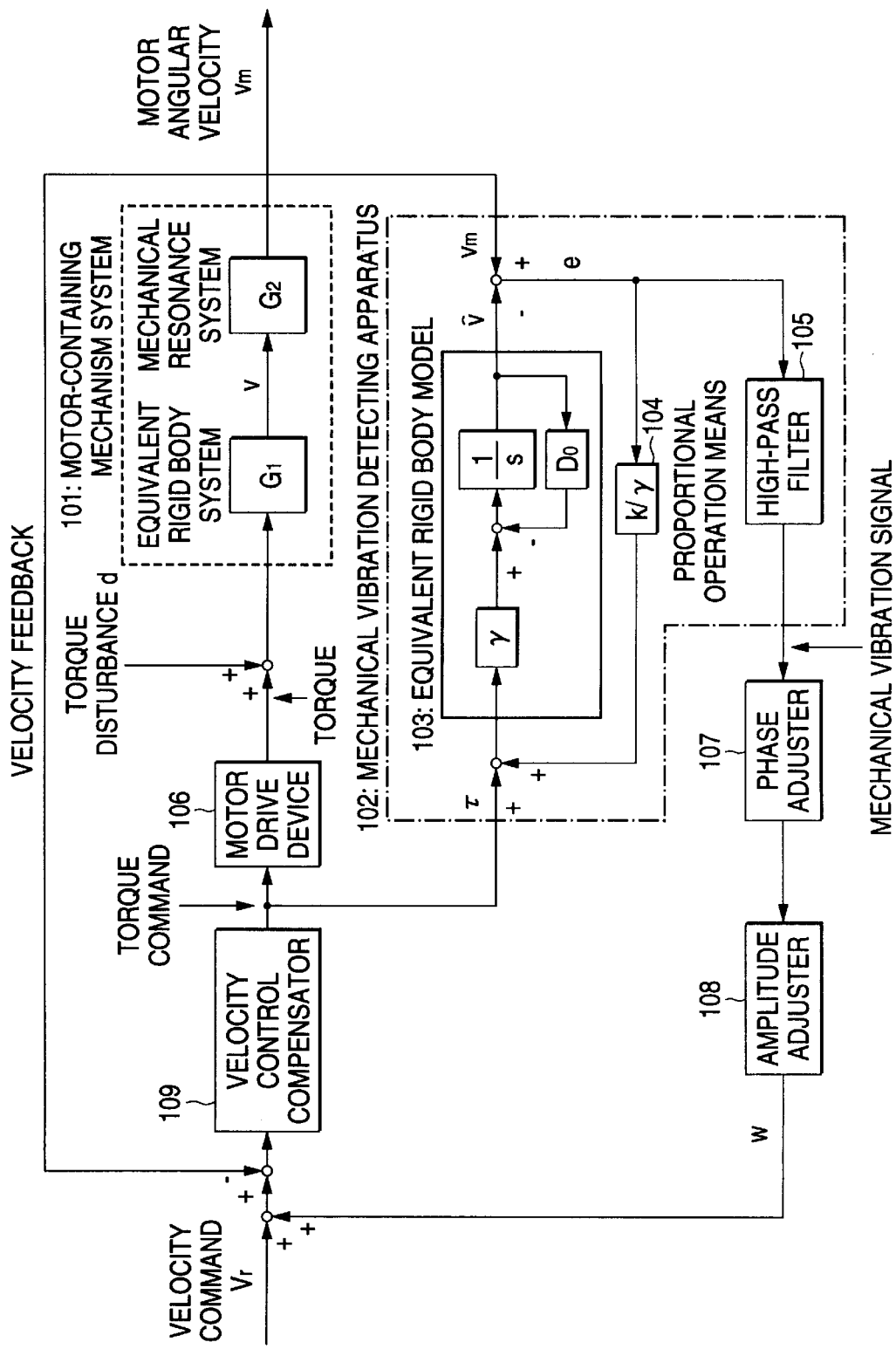
FIG. 4 is a diagram showing a fourth embodiment of the present invention.

A third embodiment of the present invention as to the vibration-reduction control apparatus will be described below with reference to FIG. 4. FIG. 4 shows the case where the present invention is applied to a motor velocity control apparatus. In FIG. 4, the motor-containing mechanism system 101 and the mechanical vibration detecting apparatus 102 are the same as those in the first embodiment, and the motor drive device 106, the phase adjuster 107 and the amplitude adjuster 108 have the same functions as those in the second embodiment, except that the output w of the amplitude adjuster 108 is added to a velocity command so that the added-up signal is supplied, as a new velocity command, to the motor velocity control apparatus. The reference numeral 109 designates a velocity control compensator which is supplied with a difference signal between the velocity command and a velocity feedback signal, and which outputs a torque instruction.

As described above, in the first, second and third embodiments, a value obtained by addition of torque disturbance d to the torque instruction may be supplied, as a new torque signal, to the mechanical-vibration detecting apparatus 102 if the detected or estimated value of the torque disturbance d is obtained. In this case, the high-pass filter 105 becomes unnecessary. When, for example, the torque instruction is determined on the basis of proportional integrating control in the velocity control compensator 109 in the third embodiment, a value obtained by inversion of the positive/negative sign of the resulting value of the integrating operation may be used as the estimated torque disturbance value.

INDUSTRIAL APPLICABILITY

The present invention can be applied to various motor-driven industrial machines such as machine tools, robots, semiconductor producing apparatuses, metallurgical apparatuses, and other general industrial machines, and office machines.

We claim:

1. In a motor control apparatus for controlling the torque of a motor, a mechanical-vibration detecting apparatus characterized in that said apparatus comprises:

an equivalent rigid body model having transfer characteristics of $G1=\gamma/(s+D0)$, where the motor is connected to a load by an equivalent linear spring, K is a constant of the equivalent linear spring, Jm is a moment of inertia of the motor, JL is a moment of inertia of the load, Dm is a viscous friction coefficient of the motor, DL is a viscous friction coefficient of the load, and DT is an equivalent viscous friction coefficient of the equivalent linear spring (where $\gamma=\omega a^2/(Jm\omega r^2)$, $\omega a^2=K/JL$, $\omega r^2=\{(1+a)K/(\alpha Jm)\}[(1+(DmDT+DLDT+DmDL)/\{(1+\alpha)JmK\}]$, $\alpha=JL/Jm$, $D0=[(Dm+DL)/\{(1+\alpha)Jm\}]\cdot(1/[1+(DmDT+DLDT+DmDL)/\{(1+\alpha)JmK\}])$, s is Laplace operator);

a proportional operation means;

a high-pass filter; and means for adding a torque signal of said motor control apparatus and an output of said proportional operation means to supply a resulting additional signal to said equivalent rigid body model, and for subtracting an output of said equivalent rigid body model from a velocity signal of said motor control apparatus to supply a resulting difference signal to said high-pass filter so that an output of said high-pass filter is used as a mechanical vibration signal; and means for supplying the difference signal to said proportional operation means.

2. In a motor control apparatus for controlling the torque of a motor, a vibration-reduction control apparatus characterized in that said apparatus comprises:

an equivalent rigid body model having transfer characteristics of $G1=\gamma/(s+D0)$, where the motor is connected to a load by an equivalent linear spring, K is a constant of the equivalent linear spring, Jm is a moment of inertia of the motor, JI, is a moment of inertia of the load, Dm is a viscous friction coefficient of the motor, DL is a viscous friction coefficient of the load, and DT is an equivalent viscous friction coefficient of the equivalent linear spring (where $\gamma=\omega a^2/(Jm\omega r^2)$, $\omega a^2=K/JL$, $\omega r^2=\{(1+a)K/(\alpha Jm)\}[(1+(DmDT+DLDT+DmDL)/\{(1+\alpha)JmK\}]$, $\alpha=JL/Jm$, $D0=[(Dm+DL)/\{(1+\alpha)Jm\}](1/[1+(DmDT+DLDT+DmDL)/\{(1+\alpha)JmK\}])$, s is Laplace operator);

a proportional operation means;

a high-pass filter;

a phase adjuster;

an amplitude adjuster; and means for adding a torque signal of said motor control apparatus and an output of said proportional operation means to supply a resulting addition signal to said equivalent rigid body model, and for subtracting an output of said equivalent rigid body model from a velocity signal of said motor control apparatus to supply a resulting difference signal to said high-pass filter, wherein an output of said high-pass filter is supplied to said phase adjuster, and an output of said phase adjuster is supplied to said amplitude adjuster, so that a signal obtained by adding an output of said amplitude adjuster to a torque command given to said motor control apparatus is used as a new torque command; and means for supplying the difference signal to said proportional operation means.

3. In a motor control apparatus for controlling the torque of a motor, a vibration-reduction control apparatus characterized in that said apparatus comprises:

an equivalent rigid body model having transfer characteristics of $G1=\gamma/(s+D0)$, where the motor is connected to a load by an equivalent linear spring, K is a constant of the equivalent linear spring, Jm is a moment of inertia of the motor, JL is a moment of inertia of the load, Dm is a viscous friction coefficient of the motor, DL is a viscous friction coefficient of the load, and DT is an equivalent viscous friction coefficient of the equivalent linear spring (where $\gamma=\omega a^2/(Jm\omega r^2)$, $\omega a^2= K/JL$, $\omega r^2=\{(1+a)K/(\alpha Jm)\}[(1+(DmDT+DLDT+DmDL)/\{(1+\alpha)JmK\}]$, $\alpha=JL/Jm$, $D0=[(Dm+DL)/\{(1+\alpha)Jm\}]\cdot(1/[1+(DmDT+DLDT+DmDL)/\{(1+\alpha)JmK\}])$, s is Laplace operator);

a proportional operation means;

a high-pass filter;

a phase adjuster;

an amplitude adjuster; and means for adding a torque signal of said motor control apparatus and an output of said proportional operation means to supply a resulting addition signal to said equivalent rigid body model, and for subtracting an output of said equivalent rigid body model from a velocity signal of said motor control apparatus to supply a resulting difference signal to said high-pass filter, wherein an output of said high-pass filter is supplied to said phase adjuster, and an output of said phase adjuster is supplied to said amplitude adjuster, so that a signal obtained by adding an output of said amplitude adjuster to a velocity command given to said motor control apparatus is used as a new velocity command; and means for supplying the difference signal to said proportional operation means.

4. In a motor control apparatus for controlling the torque of a motor, a mechanical-vibration detecting apparatus characterized in that said apparatus comprises:

an equivalent rigid body model;

a proportional operation means of only proportional operation;

a high-pass filter; and means for adding a torque signal of said motor control apparatus and an output of said proportional operation means of only proportional operation to supply a resulting additional signal to said equivalent rigid body model, and for subtracting an output of said equivalent rigid body model from a velocity signal of said motor control apparatus to supply a resulting difference signal to said high-pass filter so that an output of said high-pass filter is used as a mechanical vibration signal; and means for making the difference signal an input signal of said proportional operation means of only proportional operation.

5. In a motor control apparatus for controlling the torque of a motor, a vibration-reduction control apparatus characterized in that said apparatus comprises:

an equivalent rigid body model;

a proportional operation means of only proportional operation;

a high-pass filter;

a phase adjuster;

an amplitude adjuster; and means for adding a torque signal of said motor control apparatus and an output of said proportional operation means of only proportional operation to supply a resulting addition signal to said equivalent rigid body model, and for subtracting an output of said equivalent rigid body model from a velocity signal of said motor control apparatus to supply a resulting difference signal to said high-pass filter, wherein an output of said high-pass filter is supplied to said phase adjuster, and an output of said phase adjuster is supplied to said amplitude adjuster, so that a signal obtained by adding an output of said amplitude adjuster to a torque command given to said motor control apparatus is used as a new torque command and means for supplying the difference signal to said proportional operation means of only proportional operation.

6. In a motor control apparatus for controlling the torque of a motor, a vibration-reduction control apparatus characterized in that said apparatus comprises:

an equivalent rigid body model;

a proportional operation means of only proportional operation;

a high-pass filter;

a phase adjuster;

an amplitude adjuster; and means for adding a torque signal of said motor control apparatus and an output of said proportional operation means of only proportional operation to supply a resulting addition signal to said equivalent rigid body model and for subtracting an output of said equivalent rigid body model from a velocity signal of said motor control apparatus to supply a resulting difference signal to said high-pass filter, wherein an output of said high-pass filter is supplied to said phase adjuster, and an output of said phase adjuster is supplied to said amplitude adjuster, so that a signal obtained by adding an output of said amplitude adjuster to a velocity command given to said motor control apparatus is used as a new velocity command; and means for supplying the difference signal to said proportional operation means of only proportional operation.

7. A mechanical-vibration detecting apparatus and a vibration-reduction control apparatus according to any one of claims 1 through 6, characterized in that said apparatus further comprises means for obtaining a torque disturbance signal by detection or estimation, and means for adding said torque disturbance signal to said torque signal to thereby use a resulting signal as a new torque signal.

* * * * *